(12) United States Patent
Bayer et al.

(10) Patent No.: US 9,181,983 B2
(45) Date of Patent: Nov. 10, 2015

(54) METHOD AND DEVICE FOR LUBRICATING AND COOLING A BEARING THAT IS SUBJECT TO HIGH LOADS

(75) Inventors: Oswald Bayer, Aidhausen (DE); Oliver Schellberg, Wiebelsberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2484 days.

(21) Appl. No.: 11/721,880

(22) PCT Filed: Dec. 14, 2005

(86) PCT No.: PCT/DE2005/002246
§ 371 (c)(1),
(2), (4) Date: Aug. 24, 2007

(87) PCT Pub. No.: WO2006/063571
PCT Pub. Date: Jun. 22, 2006

(65) Prior Publication Data
US 2009/0263059 A1    Oct. 22, 2009

(30) Foreign Application Priority Data
Dec. 16, 2004 (DE) .................. 10 2004 060 479

(51) Int. Cl.
| F16N 1/00 | (2006.01) |
|---|---|
| F16C 17/00 | (2006.01) |
| F16C 21/00 | (2006.01) |
| F16C 43/00 | (2006.01) |
| F16C 37/00 | (2006.01) |
| F16C 33/66 | (2006.01) |
| F16N 7/32 | (2006.01) |

(52) U.S. Cl.
CPC ........... *F16C 37/007* (2013.01); *F16C 33/6662* (2013.01); *F16C 33/6688* (2013.01); *F16N 7/32* (2013.01)

(58) Field of Classification Search
CPC ............. C10M 107/24; C10M 111/04; C10M 107/34; C10M 169/04; C10M 2209/108
USPC .......................................................... 184/5
See application file for complete search history.

(56) References Cited

U.S. PATENT DOCUMENTS

| 3,885,842 | A | * | 5/1975 | Furutsu ........................ 384/468 |
|---|---|---|---|---|
| 4,714,199 | A | * | 12/1987 | Heath et al. ................... 239/412 |
| 5,313,965 | A | * | 5/1994 | Palen ............................. 134/61 |
| 5,375,426 | A | * | 12/1994 | Burgener ......................... 62/85 |
| 6,001,245 | A | * | 12/1999 | Reich et al. ................... 210/634 |

(Continued)

FOREIGN PATENT DOCUMENTS

| DE | 38 33 581 A | 4/1990 |
|---|---|---|
| DE | 199 59 472 A | 6/2001 |
| JP | 2005 299923 | 10/2005 |

*Primary Examiner* — Henry Liu
(74) *Attorney, Agent, or Firm* — Simpson & Simpson, PLLC

(57) ABSTRACT

The invention relates to a method for lubricating and cooling a bearing that is subject to high loads and to a device for carrying out said method. The invention is characterized by dissolving a lubricant in a supercritical gas that is cooled down to a low temperature and feeding the gas/lubricant mixture to the baring. The gas/lubricant mixture is relaxed in the bearing area, thereby releasing the lubricant and lubricating the bearing. The now subcritical gas that is cooled down to a low temperature is used for cooling and is discharged to the exterior. The gas used is carbon dioxide ($CO_2$) and the lubricant is a hydrocarbon-based lubricant.

8 Claims, 2 Drawing Sheets

(56) References Cited

U.S. PATENT DOCUMENTS

| | | |
|---|---|---|
| 6,228,394 B1* | 5/2001 | Horhota et al. ............... 424/456 |
| 7,186,093 B2* | 3/2007 | Goshi ............................ 417/53 |
| 2003/0182731 A1* | 10/2003 | Worm et al. ...................... 8/137 |
| 2006/0073041 A1* | 4/2006 | Goshi ........................ 417/423.7 |
| 2006/0213820 A1* | 9/2006 | Bertram et al. .............. 210/96.1 |
| 2006/0247139 A1* | 11/2006 | Skerlos et al. ................ 508/154 |
| 2008/0293599 A1* | 11/2008 | Skerlos et al. ................ 508/154 |

* cited by examiner

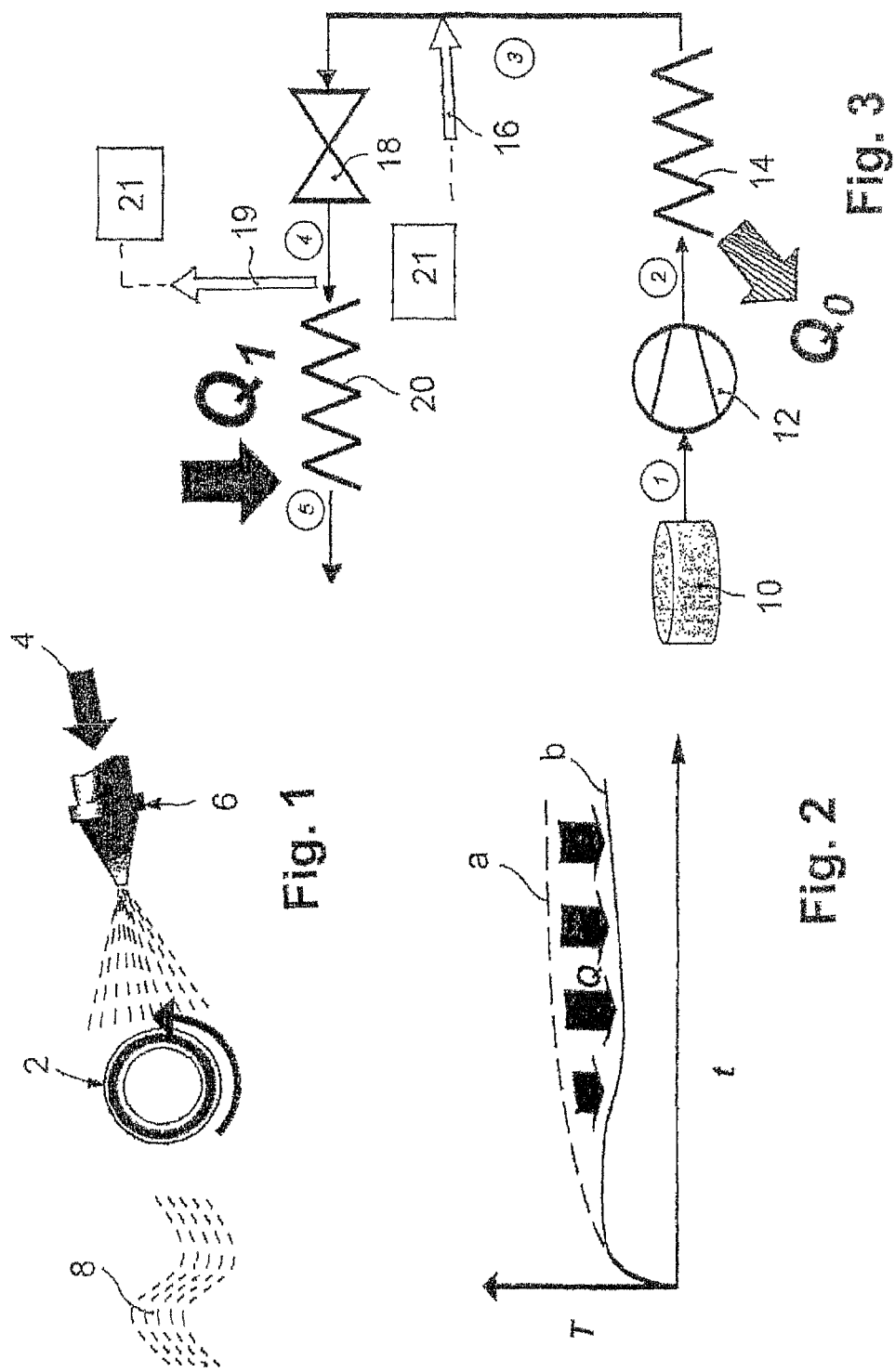

METHOD AND DEVICE FOR LUBRICATING AND COOLING A BEARING THAT IS SUBJECT TO HIGH LOADS

FIELD OF THE INVENTION

The invention relates to a method for lubricating and cooling a highly-loaded bearing, in particular a fast-running and/or thermally-loaded bearing, with a lubricant and a gas being mixed, and to a device for carrying out said method.

BACKGROUND OF THE INVENTION

Highly-loaded bearings of the above-described type serve for example for mounting motor spindles in machine tools, compressor and turbine shafts in gas turbines, transmission shafts in fast-running transmissions etc. At high rotational speeds of bearings, heat is generated as a result of the friction, which heat leads to a temperature increase in the bearing. The increased bearing temperature generally adversely affects the geometry of the bearing and therefore the bearing accuracy, and in addition, said increased bearing temperature also adversely affects the quality of the lubricant and therefore the lubricating action. In order to avoid said disadvantages, various measures are already known for cooling highly-loaded bearings, specifically for example by means of a coolant which is conducted through cooling ducts in the bearing surroundings or by means of an increase in the lubricant quantity beyond the minimum lubricant quantity required for lubricating. The first measure is constructively and structurally complex and expensive, and leads in general to high temperature differences in the bearing, with the risk of the bearing being damaged. The latter measure possibly entails high hydraulic losses in the bearing, so that the drive power must be correspondingly increased, resulting in the efficiency being impaired.

With the Japanese patent publication no. 2000-329140 a bearing unit is known in which, after passing through a radial bearing and an axial bearing, a lubricant is added in a mixing chamber to a gas, in this particular case air, in order to cool the lubricant. The lubricant/gas mixture is subsequently supplied to a so-called occlusion device, in which the gas which has absorbed part of the lubricant heat is separated again from the lubricant and discharged into the environment, and from which the cooled lubricant is extracted and supplied back to the bearings.

Said arrangement, however, has the disadvantage that the lubricant heats up to its end temperature while still in the bearing region, so that there are relatively high temperature differences between the region in which the lubricant is supplied to the bearing arrangement and the region in which the lubricant leaves the bearing arrangement, and the bearing geometry is therefore still adversely affected. Furthermore, the required quantity of lubricant is very high, so that high hydraulic losses occur in the bearing, and the efficiency of said bearing is reduced.

OBJECT OF THE INVENTION

The invention is based on the object of creating a method for lubricating and cooling a highly-loaded bearing by means of the lubricant supply, and to a device for carrying out said method, by means of which effective and uniform cooling of a bearing can be obtained without additional hydraulic losses in the bearing.

DESCRIPTION OF THE INVENTION

The invention is based on the knowledge that, utilizing a typical property of supercritical or hypercritical gases, specifically that of being able to dissolve other media such as for example lubricants, it should possible to effect a heat transfer from the bearing to the gas directly and from the lubricant to the gas already in the region of the bearing and not only downstream of the bearing, in order to thereby ensure effective and uniform cooling of the entire bearing without additional lubricant quantities.

According to the features of claim 1, the invention proceeds from a method and a device for lubricating and cooling a highly-loaded bearing, in particular a fast-running and/or thermally-loaded bearing, in which a lubricant and a gas are mixed in order to cool the bearing.

The method according to the present invention provides the following method steps:
  a) A gas is placed into a supercritical state.
  b) A lubricant is dissolved in the supercritical gas.
  c) The gas/lubricant mixture is supplied to the bearing and is relieved of pressure therein with the lubricant being separated from the gas.
  d) Gas and lubricant are discharged out of the bearing.

A lubricant for lubrication and a supercooled gas for cooling are accordingly advantageously present in the bearing region.

Since the cooling and transport medium for the lubricant is a gas, no additional bearing losses are generated. By means of a suitable selection of the gas, it is possible to obtain that, during the relief of pressure, said gas is present for a brief time as ""solid snow"" which can act not only as cooling medium but additionally also directly as lubricant. Since the heat transfer from the bearing and from the lubricant to the gas takes place already in the region of the bearing and not only downstream of the bearing, uniform and effective cooling of the bearing is obtained. By means of the gas cooling, it is possible above all for the mounted rotating machine part to also be cooled without an increase in losses, so that the temperature differences between the inner ring and the outer ring of the bearing can also be kept within low limits.

According to one embodiment of the invention, it is provided that the gas is extracted from a gas tank and, after flowing through the bearing, is discharged into the atmosphere, with an environment-friendly gas of course being used, as will be explained in more detail further below.

According to a further embodiment of the invention, with a suitable selection of the gas, said gas can be stored in the gas tank under natural ambient conditions and, only for the purpose of being placed into a supercritical state, can initially be adiabatically compressed, and then isobarically cooled before the lubricant is supplied and dissolved in the supercritical gas.

In the bearing, the gas is preferably adiabatically relieved of pressure into an intensely supercooled state while releasing the lubricant, and is then isobarically heated, that is to say heated at a constant ambient pressure, while absorbing bearing heat, and discharged into the atmosphere. The lubricant is for example extracted from a lubricant tank, lubricant sump or the like and, after passing through the bearing, is returned into the lubricant tank again. Carbon dioxide ($CO_2$) and a hydrocarbon-based lubricant are provided respectively as a suitable gas and suitable lubricant for the method according to the invention.

The device according to the invention for carrying out the above-described method has a device for mixing a lubricant with a gas, and is characterized in particular by the following features:
  a gas tank for storing a gas under natural atmospheric conditions;"

a compressor (pump), connected downstream of the gas tank, for compressing the gas;

a heat exchanger serving as a cooling device, connected downstream of the compressor, for cooling the gas;

an apparatus, connected downstream of the heat exchanger, for supplying a lubricant to the gas;

a device, connected downstream of said apparatus, for supplying the gas/lubricant mixture to the bearing;

a throttle or apparatus, assigned to the bearing, for relieving the pressure of the gas/lubricant mixture; and a device, connected downstream of the bearing, for discharging the gas and for collecting the lubricant.

As has already been described further above, the gas is preferably discharged into the atmosphere, so that the gas circuit is an open circuit.

According to a further embodiment of the device according to the invention, a lubricant tank is provided for the lubricant, from which lubricant tank the lubricant is extracted for the purpose of being supplied to the gas, and into which said lubricant is returned after passing through the bearing. The lubricant circuit is accordingly a closed circuit.

BRIEF DESCRIPTION OF THE DRAWINGS

One preferred embodiment of the invention is explained in more detail below with reference to the appended drawings, in which:

FIG. 1 schematically and diagrammatically shows the procedure for lubricating and cooling a radial bearing;

FIG. 2 shows a temperature/time diagram of the gas during the procedure;

FIG. 3 shows a flow diagram of the method with the different method steps;

DETAILED DESCRIPTION OF THE DRAWINGS

Figure 4:
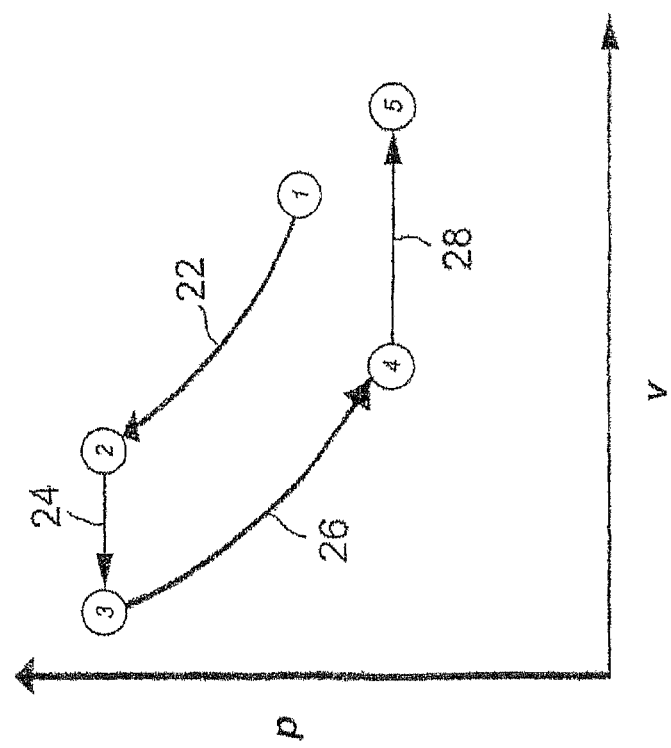
FIG. 4 shows the procedure of the gas in a p-v diagram.

FIG. 1 diagrammatically illustrates the method according to the invention and shows a device for carrying out said method in the region of the bearing 2, in the present case a radial bearing, which is to be lubricated and cooled. A gas/lubricant mixture 4 which has been placed into a supercritical state in a way described previously and to be described on the basis of FIG. 3 and in which a lubricant is dissolved, is relieved of pressure in a throttle device 6, which is a non-constructive component of the bearing, for example to the ambient pressure prevailing in the bearing 2. The lubricant which is dissolved in the gas is hereby separated again, so that said lubricant can be used to lubricate the bearing 2. The gas which is intensely supercooled by the relief of pressure absorbs heat from the surroundings, that is to say from the bearing 2 and from the lubricant, so that the bearing 2 is cooled. The heated gas 8 which has been separated from the lubricant is discharged and thereby removes the heat which is absorbed from the bearing 2.

FIG. 2 schematically shows the temperature T of a bearing over the time t without effective cooling (curve a) and with effective cooling according to the present invention (curve b). As can be seen from FIG. 2, the temperature T of the bearing over the course of its operating time t without effective cooling (curve a) increases continuously in the direction of a limit value which, in the case of highly-loaded bearings, can lie above a value which is compatible with the bearing, as was explained in the introduction. By means of a constant removal of a specific heat quantity, that is to say the heat quantity Q per unit time, the temperature curve is displaced (curve b) such that the limit value which is ultimately reached lies below the compatibility limit for the bearing.

FIG. 3 shows a flow diagram of the method according to the invention, with regard to the gas used in said method. The gas is extracted from a gas tank 10 in which it is stored for example under normal atmospheric conditions. The gas is supplied (path ①) to a compressor 12 and is adiabatically compressed in said compressor 12 and therefore placed into a supercritical state, with its temperature T and its pressure p increasing. The supercritical gas is subsequently supplied (path ②) to a cooling device 14 where it is isobarically cooled but remains supercritical. The dissipated specific heat quantity is denoted by $Q_0$.

Lubricant which is extracted from a lubricant tank 21 is added to the cooled gas, as illustrated by the arrow 16. The lubricant is dissolved in the cooled, supercritical gas. The gas/lubricant mixture is subsequently supplied to a throttle device 18 which is assigned constructively to the bearing, in which throttle device 18 said gas/lubricant mixture is adiabatically relieved of pressure to the ambient pressure prevailing in the bearing and placed into a wet vapor phase. The dissolved lubricant is separated (arrow 19), so that it can perform its actual task of lubricating the bearing.

Since the gas is briefly present as "solid snow" as it is relieved of pressure, it can likewise serve directly as lubricant. As it passes through the bearing (path ④), the gas absorbs heat from the bearing (and from the lubricant), so that these are cooled. The bearing region is illustrated symbolically in FIG. 3 as a heat exchanger 20. The specific heat quantity absorbed by the gas is denoted by $Q_1$.

The gas which is isobarically heated in the bearing region (heat exchanger 20) is discharged (path ⑤) into the atmosphere, while the lubricant is supplied back to the lubricant tank 21.

The procedure illustrated in FIG. 3 is briefly summarized again below:

① (Ideally unthrottled) $CO_2$
  (p1, T1)
② Adiabatically compressed $CO_2$
  (supercritical)
  (p2>p1, T2>T1)
③ Isobarically cooled $CO_2$
  (supercritical)
  (p3=p2, T3<T2)
  (Addition of lubricant)
④ Adiabatically expanded $CO_2$
  (Wet vapor)
  (p4=pu, T4<Tu)
  (Lubricant separated)
⑤ Isobarically heated $CO_2$ (gas)
  (p5=pu, T5=Tu)

FIG. 4 shows the described procedure, with regard to the gas, in a p-v diagram. The gas states denoted by ①, ② etc. correspond to the gas states of FIG. 3 which are denoted by the same symbols.

The gas (①) which is extracted from the gas tank is adiabatically compressed along the curve 22, isobarically cooled along the curve 24, adiabatically relieved of pressure along the curve 26, and isobarically heated along the curve 28. The bearing heat which is absorbed in the process is dissipated outwards into the atmosphere. As can be seen from FIG. 4 and as has already been discussed further above, the illustrated process is not a cycle but rather an "open" process, that is to say the gas is expended.

Figure 5:
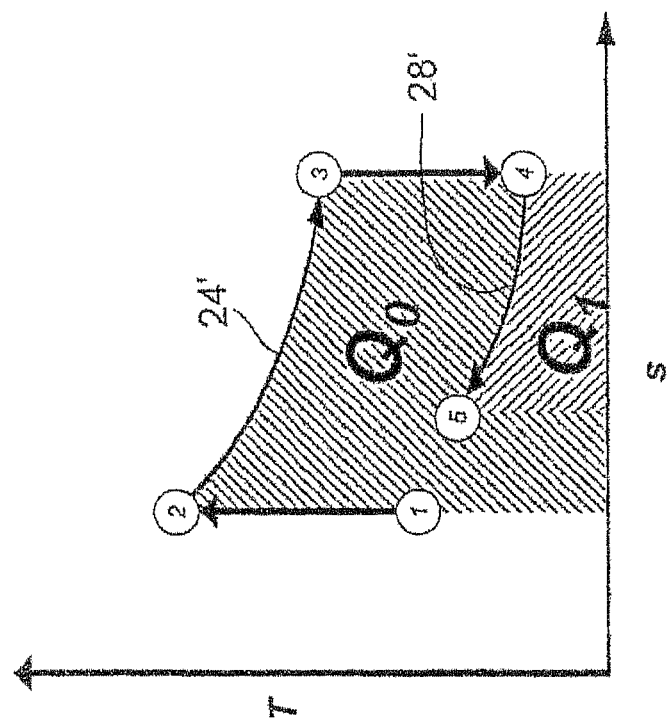
FIG. 5 shows the procedure of the gas in a T-s diagram.

FIG. 5 shows the same procedure, with regard to the gas, again in a T-s diagram, with the symbols ①, ② etc. which are used again corresponding to the symbols used in FIGS. 3 and 4. As is generally known, the areas under an isobaric curve correspond to an enthalpy difference, that is to say a supplied or dissipated specific heat quantity, so that the specific heat quantity $Q_0$ extracted from the gas can be read from below the isobaric curve 24', and the specific heat quantity $Q_1$ absorbed by the gas can be read from below the isobaric curve 28'.

LIST OF REFERENCE SYMBOLS

2 Bearing
4 Gas/lubricant mixture
6 Throttle device
8 Gas
10 Gas tank
12 Compressor
14 Cooling device
16 Arrow
18 Throttle device
19 Arrow
20 Heat exchanger, bearing
21 Lubricant tank
22 Curve
24 Curve
24' Curve
26 Curve
28 Curve
28' Curve
a Curve
b Curve
p Pressure
Q Specific heat quantity
$Q_0$ Dissipated heat quantity
$Q_1$ Supplied heat quantity
T Temperature
t Time

The invention claimed is:

1. A method for lubricating and cooling a highly-loaded bearing, in a fast-running and/or thermally-loaded bearing, with a lubricant and a gas being mixed, comprising:
   a) placing a gas into a supercritical state such that the gas becomes a supercritical gas;
   b) dissolving a lubricant, which is independent of the gas, into the supercritical gas;
   c) supplying the gas/lubricant mixture to the bearing such that pressure therein is relieved and the lubricant is separated from the gas; and
   d) discharging the gas and lubricant out of the bearing.

2. The method as claimed in claim 1, wherein the gas is extracted from a gas tank and, after flowing through the bearing, is discharged into the atmosphere.

3. The method as claimed in claim 2, wherein the gas is stored in the gas tank under natural ambient conditions and is adiabatically compressed for the purpose of being placed into a supercritical state.

4. The method as claimed in claim 1, wherein the gas is isobarically cooled after the compression and before the addition of the lubricant.

5. The method as claimed in claim 2, wherein in the bearing region, the gas is adiabatically relieved of pressure with the lubricant being released and is isobarically heated with bearing heat being absorbed, and is discharged into the atmosphere.

6. The method as claimed in claim 1, wherein the lubricant is extracted from a lubricant tank or the like and, after passing through the bearing, is returned into the lubricant tank.

7. The method as claimed in claim 1, wherein carbon dioxide ($CO_2$) is used as the gas.

8. The method as claimed in claim 1, wherein hydrocarbon-based lubricant is used as the lubricant.

* * * * *